United States Patent [19]

Berg

[11] 4,057,257
[45] Nov. 8, 1977

[54] SEAL ASSEMBLY

[75] Inventor: David W. Berg, Minneapolis, Minn.

[73] Assignee: Tol-O-Matic, Inc., Minneapolis, Minn.

[21] Appl. No.: 758,043

[22] Filed: Jan. 10, 1977

[51] Int. Cl.² .......................... F01B 9/00; F16J 15/18
[52] U.S. Cl. .......................................... 277/4; 277/9; 277/51; 277/47; 277/165; 277/205; 92/137; 92/165 R
[58] Field of Search ...................... 277/62, 9, 11, 35, 4, 277/47-51, 124, 165, 177, 178, 183, 185, 186, 188 R, 189, 205, 228; 92/165 R, 166, 168, 137; 173/144, 147

[56] References Cited

U.S. PATENT DOCUMENTS

| 3,013,824 | 12/1961 | Wilson | 277/4 X |
|---|---|---|---|
| 3,154,309 | 10/1964 | Voitik | 277/51 X |
| 3,269,737 | 8/1966 | Freese | 92/165 R X |
| 3,667,552 | 6/1972 | Gordon | 173/147 |
| 3,717,071 | 2/1973 | Gordon | 92/137 |
| 3,885,801 | 5/1975 | Scannell | 277/165 |

FOREIGN PATENT DOCUMENTS

| 496,641 | 10/1953 | Canada | 277/9 |
|---|---|---|---|
| 952,930 | 8/1974 | Canada | 277/165 |
| 2,404,244 | 8/1975 | Germany | 92/137 |
| 727,099 | 3/1955 | United Kingdom | 277/35 |

Primary Examiner—Robert S. Ward, Jr.
Attorney, Agent, or Firm—Dorsey, Windhorst, Hannaford, Whitney & Halladay

[57] ABSTRACT

A seal assembly for use in a cable cylinder to form an effective seal about a generally cylindrical cable section. The seal assembly includes first and second seal retaining member disposed on opposite sides of a seal element, all of which are disposed within a cylindrical bore of a gland member. The cylindrical bore includes a shoulder portion to retain one of the retaining members and a groove to retain the other for easy insertion and removal thereof.

10 Claims, 5 Drawing Figures

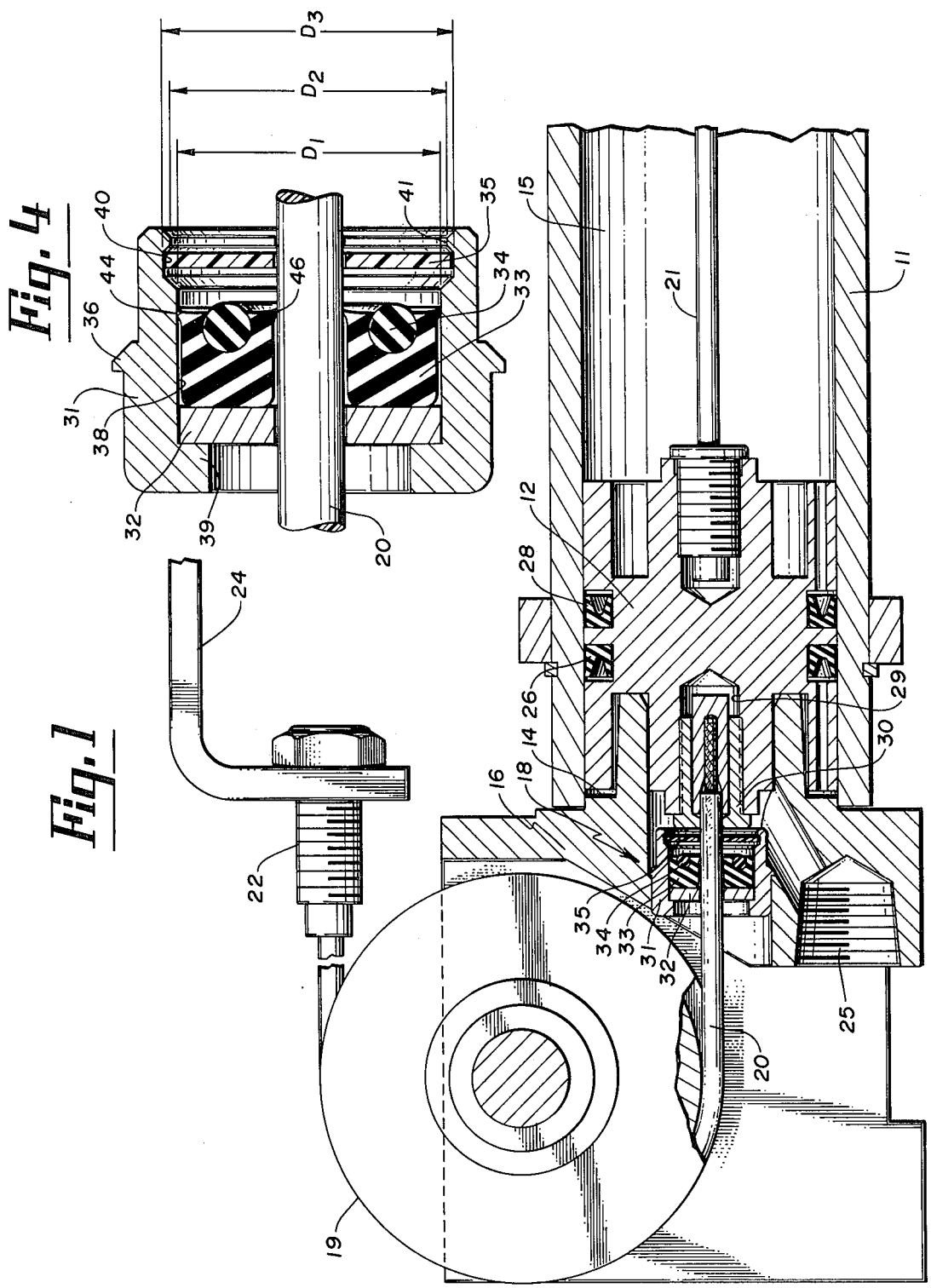

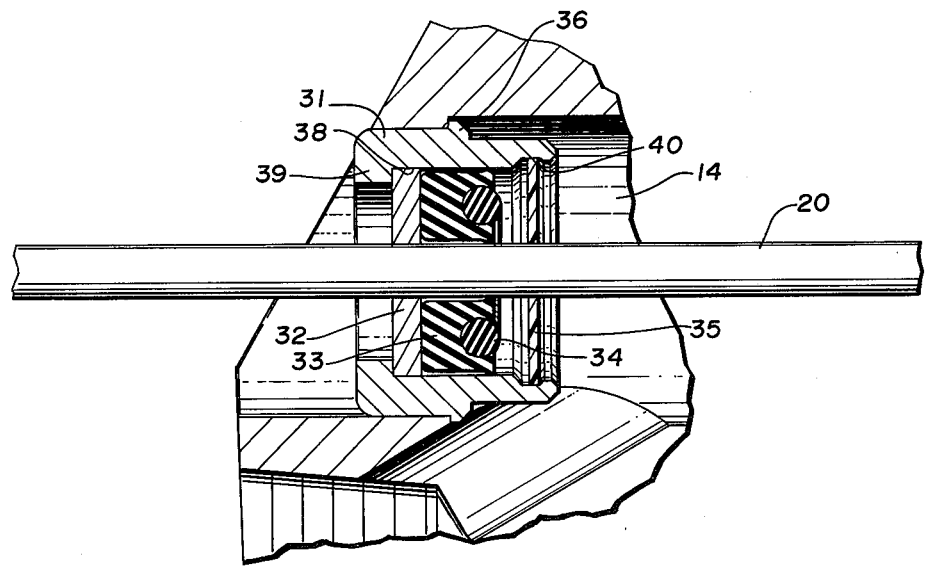
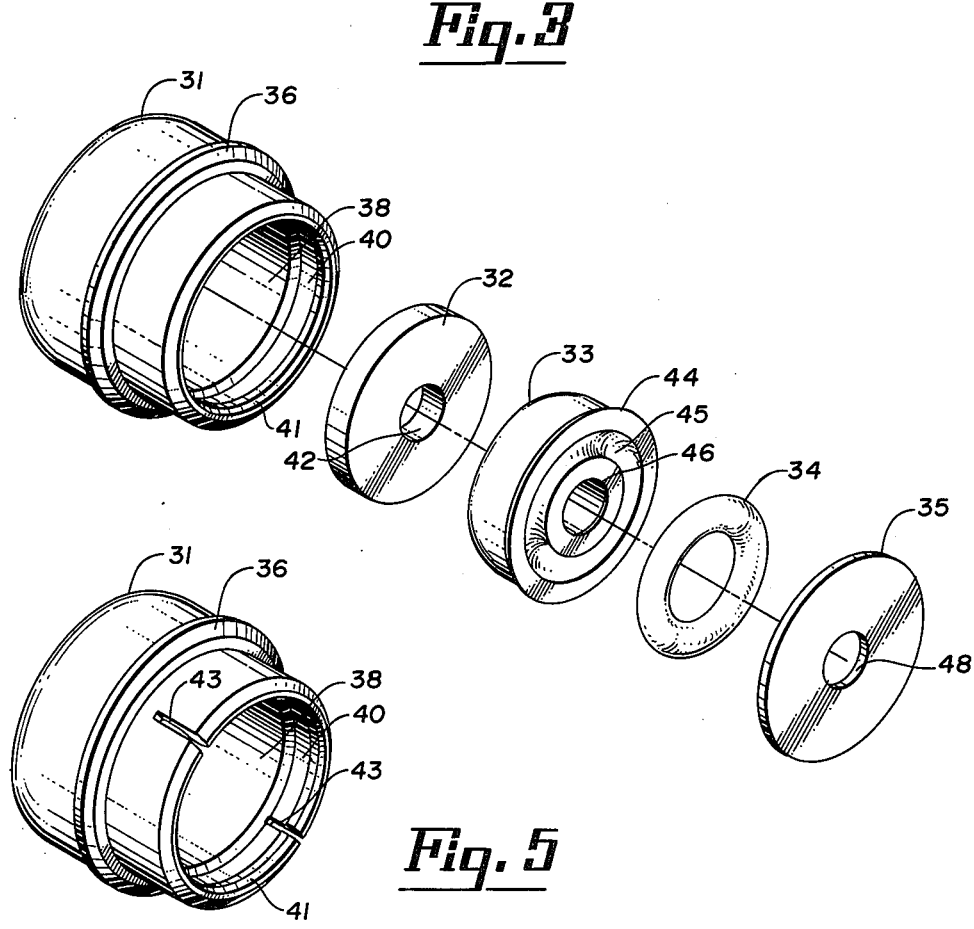

SEAL ASSEMBLY

BACKGROUND OF THE INVENTION

The present invention relates generally to an improved seal assembly and more particularly, to an improved seal assembly for use in a cable cylinder to form an effective seal about a generally cylindrical cable to prevent leakage from a pressurized pneumatic or hydraulic fluid chamber.

Cable cylinders of the prior art comprise an elongated cylinder member containing a piston movable within the cylinder from one end to the other. Such movement is responsive to appropriate introduction of a pressurized fluid into portions of the elongated cylinder. A pair of cable sections extend from the ends of the piston and around a corresponding pair of end pulleys where they are joined together by a clevis or other connection means. Disposed at each end of the cylinder is a seal assembly forming a seal about the exterior surface of the cable to prevent pressurized fluid from leaking out of the cylinder. Many types of seal assemblies have been used in cable cylinders to accomplish this sealing function. Most of these contain a plurality of seal elements which are retained via a gland or other means within a portion of the cable cylinder housing by means which are semi-permanent or very difficult to get at. Due to the general inaccessibility of the seal elements and the means retaining them within the cylinder housing, it is very difficult and time consuming to inspect, replace and/or repair the seal elements. Accordingly, there is a real need in the art for a seal assembly usable in connection with a cable cylinder which not only functions as an effective seal about the cable cylinder, but also is comprised of elements which are readily accessible for repair and/or replacement and which can be quickly and easily disassembled and reassembled when this is desired.

SUMMARY OF THE INVENTION

In contrast to the prior art, the present invention comprises a seal assembly for use in a cable cylinder which not only forms an effective seal about the generally cylindrical cable, but which also is readily and easily assembled and disassembled and is accessible for inspection, repair and/or replacement.

More particularly, the seal assembly of the present invention includes a gland member having a generally cylindrical bore which is press fit within the cable cylinder housing. The cylindrical bore of the gland is disposed generally coaxially with the cylindrical cable and has one end disposed toward and one end disposed away from the respective pressurized chamber. The end of the cylindrical bore away from the pressurized chamber includes an inwardly-disposed shoulder portion or other means for retaining and for engagement by a first generally disc shaped seal retaining member. The end of the cylindrical bore adjacent the pressurized chamber includes a groove or channel, the diameter of which is greater than the diameter of the cylindrical bore portion. This channel or groove is adapted for engagement by a second disc-shaped seal retaining member. Disposed between the first and second disc-shaped seal retaining members is a seal element for forming an effective seal between the cylindrical bore of the gland and the external surface of the cable.

With this structure, the first and second seal retaining members and the seal element are removably retained within the gland by the second seal retaining disc which is disposed within the groove on the inside of the gland. When disassembly of the seal assembly is desired, an appropriate manual force is exerted on the first seal retaining member in the direction of the pressurized chamber causing the second seal retaining member to snap out of the groove and thus allowing the first and second retaining members and the seal element to be removed from the gland. If assembly of the seal elements is desired, they are placed onto the cable in appropriate order and a manual force is applied to the second retaining disc in a direction away from the pressurized chamber, thus causing movement of the first retaining member and the seal element into the gland and snapping of the second retaining member into the gland groove.

Accordingly, it is an object of the present invention to provide an improved seal assembly for use in a cable cylinder which is easily assembled and disassembled.

A further object of the present invention is to provide an improved seal assembly for use in a cable cylinder in which the various elements of the seal assembly are readily accessible for inspection, repair and/or replacement.

Another object of the present invention is to provide an improved seal assembly for use in a cable cylinder in which the seal elements are removably retained within a gland member by a generally flexible retaining disc member disposed within an internal groove of the gland.

These and other objects of the present invention will become apparent with reference to the drawings, the description of the preferred embodiment and the appended claims.

DESCRIPTION OF THE DRAWINGS

FIG. 1 is a plan view of one end of a cable cylinder, partially in section, showing the relationship between the seal assembly of the present invention and the cable cylinder.

FIG. 2 is a plan view, partially in section, of the seal assembly of the present invention mounted within the cable cylinder housing.

FIG. 3 is an exploded view of the various components comprising the seal assembly of the present invention.

FIG. 4 is an enlarged sectional view of the seal assembly of the present invention showing more clearly the relative diameters of various portions of the gland member.

FIG. 5 is a pictorial view of an alternate embodiment of the gland member.

DESCRIPTION OF THE PREFERRED EMBODIMENT

Reference is first made to FIG. 1 which shows a portion of a cable cylinder and the relationship between the seal assembly of the present invention and such cable cylinder. In general, the cable cylinder illustrated in FIG. 1 includes a generally elongated cylindrical tube 11 forming a hydraulic cylinder. A piston assembly 12 is housed within the cylinder 11 and is adapted for reciprocal movement back and forth therein. The piston assembly 12 defines a pair of fluid chambers 14 and 15 at each end of the cylinder 11 which may be pressurized either pneumatically or hydraulically. An end housing or section 16 is positioned at each end of the cylinder where it is appropriately connected with one end of the cylinder 11. The housing 16 functions to house a seal assembly 18 and to rotatably support a pulley 19. A pair of cable sections 20 and 21 are connected to opposite ends of the piston assembly 12 and extend from such assembly through the seal assembly 18 and around the pulley 19 positioned at opposing ends of the cable cylinder. The other ends of the cable sections 20 and 21 are connected by appropriate means 22 to a clevis or other connecting bracket 24.

Each of the end sections 16 includes means for providing appropriately pressurized fluid to the respective chambers 14 and 15. In the preferred embodiment, this means includes an appropriate supply port and conduit 25.

During operation, pressurized fluid is supplied via one of the ports 25 to its respective chamber 14 and 15 resulting in corresponding movement of the piston assembly 12 along the cylinder tube 11. Movement of the piston assembly in this manner results in movement of the cable sections 20 and 21 and corresponding movement of the connecting bracket 24. When pressurized fluid is being supplied to one of the chambers 14 and 15, the other chamber is being drained of fluid through its respective port 25. The connecting bracket 24 is adapted for connection to an appropriate tool or other device to which reciprocating motion is desired to be imparted.

The piston assembly 12 includes a pair of cup seal members 26 and 28 extending about its periphery to form an effective seal between the piston assembly 12 and the inner surface of the cylinder 11 to define the chambers 14 and 15. Each end of the piston assembly 12 also includes an internally threaded hole 29 adapted to threadedly receive a cable connecting fitting 30.

As illustrated in each of FIGS. 1-4, the seal assembly 18 comprises a generally cylindrical gland member 31, a first generally disc shaped seal retaining member 32, a seal member 33, an "O" ring 34 and a second generally disc shaped seal retaining member 35. As illustrated best in FIGS. 1 and 2, the gland member 31 is press fit into a portion of the housing or end member 16. An appropriate external peripheral rib 36 on the gland 31 serves to properly position and orient the gland 31 within the end housing 16. The fit between the gland 31 and the housing 16 is such that pressurized fluid within the chamber 14 is prevented from leaking between the housing and the gland.

With reference to FIGS. 2 and 4, it can be seen that the gland 31 includes a generally cylindrical inner bore 38 of constant diameter $D_1$ (FIG. 4) extending around the generally-cylindrical cable section 20. The gland 31 includes an inwardly extending shoulder portion 39 near one end of the cylindrical bore 38 for engagement by the seal-retaining member 32. When the gland 31 is properly secured within the housing 16, the longitudinal axis of the generally-cylindrical bore 38 is co-axial with the generally-cylindrical cable section 20 which extends through the gland 31. Also, when the gland 31 is properly positioned within the housing 16, the shoulder portion 39 is at the end of the cylindrical bore 38 opposite or away from the pressurized chamber 14.

An inner groove or recessed portion 40 is located near the end of the cylindrical bore 38 adjacent to the pressurized chamber 14. The groove or recessed portion 40 functions to retain the second seal-retaining member 35 in an operative position within the gland 31. The groove or channel 40 is defined by a short cylindrical seat portion having a diameter of $D_3$ (FIG. 4). Adjacent to one side of the groove 40 is the cylindrical bore 38. Adjacent to the other side of the groove 40, in the direction of the pressurized chamber 14 is an inner retaining edge or lip 41 having a diameter of $D_2$. As illustrated in FIG. 4, diameter $D_1$, the diameter of the cylindrical bore 38, is less than diameter $D_2$, the diameter of the retaining edge 41, which in turn is less than diameter $D_3$, the diameter of the groove or channel 40. It should also be noted that a short sloping surface exists on each side of the inner retaining edge 41. One of the sloping surfaces joins with the groove or channel 40, while the other joins with the inner edge of the gland member 31.

In the preferred embodiment, the gland 31 is constructed of a relatively rigid material such as an aluminum alloy and the second seal retaining member 35 is constructed of a generally flexible material to permit the member 35 to be manually forced by the retaining lip 41 into and out of the seating groove 40. It is contemplated, however, that the gland 31 could also be constructed of a relatively flexible material and the retaining member of a generally rigid material or that both could be constructed of a rigid material with one being provided with a means enabling the member 35 to be inserted into and removed from the groove 40. Such a means is illustrated in FIG. 5 in the form of a pair of slots 43 in the edge of gland 31. The slots 43 give the rigid gland 31 sufficient flexibility to enable the rigid member 35 to be easily manually urged past the edge 41.

The first seal-retaining member 32 is a generally disc-shaped element having a center opening 42 extending around the cable section 20. In the preferred embodiment, the member 32 is constructed of a material such as Celcon, Delrin or their equivalent. Celcon is a trademark for an acetal copolymer owned by Celanese Corporation. Delrin is a trademark for an acetal-resin product owned by E. I. Dupont deMours & Co., Inc. As previously described, the disc-shaped element 32 is adapted to be positioned within the gland 31 and in engagement with the shoulder portion 39. When in this position, the cable section 20 passes through the center opening 42 and the member 32 functions to retain the seal element 33 within the gland 31. In the preferred embodiment, the exterior diameter of the element 32 is slightly smaller than the interior diameter $D_1$ of the cylindrical bore 38.

Positioned adjacent to the retaining member 32 in the seal assembly is a seal member which is comprised of the seal element 33 and the "O" ring member 34. The seal member 33 is a U-cup type seal member having an outer edge 44 adapted for sealing engagement with the inner surface of the cylindrical bore 38 and an inner edge 46 adapted for sealing engagement with the exterior surface of the cylindrical cable section 20. Disposed on the face of the element 33 toward the chamber 14 (the pressure side of the element 33) is a generally circular groove 45 into which the "O" ring 34 is seated. In the preferred embodiment, the seal member is constructed of a rubbery material and is manufactured by the Parker Seal Company. When properly disposed within the gland 31, the edges 44 and 46 of the seal element 33 are disposed toward the pressure chamber 14. The "O" ring 34 is seated within the recessed area 45 positioned between the edges 44 and 46 and functions to bias such edges into engagement with the inner surface of the cylindrical bore 38 and the outer surface of the cylindrical cable section 20, respectively.

A gland cap or second seal retaining element 35 is positioned adjacent to the seal member 33 on the pressure side thereof. The retaining member 35 is a relatively thin, disc shaped member having a center opening 48 extending around the generally cylindrical cable section 20. In the preferred embodiment, the member 35 is constructed of a generally flexible material enabling it to be seated within the groove or channel 40 of the gland 31, however, as previously discussed, it may also be constructed of a rigid material, providing the gland 31 is constructed of a flexible material or a rigid material with means enabling the member 35 to be snapped into the groove 40. If the gland cap 35 is constructed of a flexible material, a material such as Nylon or Delrin may be used. The disc shaped retaining number 35 has an outer diameter which is greater than the diameter $D_2$ of the gland edge 41, but which is slightly less than the diameter $D_3$ of the channel or groove 40, thus facilitating the seating of the member 35 within the groove 40. Because the outer diameter of the member 35 is greater than the diameter $D_2$ of the retaining edge 41, either the member 35 or the gland 31 must have sufficient flexibility to enable the member 35 to be manually forced past the edge 41. The degree of flexibility required is dependent upon the difference in diameter $D_2$ and the outer diameter of the member 35. Although the required flexibility may be provided in either the member 35 or the gland 31, it is preferably provided in the member 35. Flexibility of the member 35 is a function of both the material from which the member is made as well as its thickness. Although various materials may be used in constructing the member 35, and although the exact thickness of the member 35 is to some extent variable, the combination of the material and thickness should be such as to provide the member 35 with flexibility sufficient to enable it to be easily urged past the edge 41. In the preferred embodiment, the outer diameter of the member 35 is about 20–25 times greater than its thickness.

Having now described the structure of the present invention in detail, the operation may be understood as follows:

First, the seal mechanism of the present invention is assembled by appropriately positioning each of the first and second seal retaining member 32 and 35 and the seal elements 33 and 34 on the cable section 20. When this is completed, the members 32, 33, 34 and 35 disposed within the gland member 31 by manually pulling the cable section 20 in FIG. 1 toward the left. This causes the fitting 30 to exert a force against the right hand surface of the seal retaining member 35 causing the members 32, 33, and 34 to be moved into the gland 31 and the member 35 to snap into the groove 40. The seal assembly is then complete and ready for operation. If the seal assembly is desired to be disassembled for inspection, repair or replacement, an appropriate manual force exerted on the left hand side of the retaining member 32 causes movement of the elements 32, 33, 34 and 35 toward the right, thereby snapping the element 35 out of the groove 40. The elements 32, 33, 34 and 35 can then be inspected, repaired or replaced and can easily be reassembled into working order in the manner discussed above. Thus, with the present invention, the seal assembly can be easily assembled and disassembled for inspection, repair or replacement, without the use of tools.

Although the description of the preferred embodiment has been quite specific, it is contemplated that various modifications could be made to the structure of such embodiment without deviating from the spirit of the present invention. Accordingly, it is intended that the scope of the present invention be dictated by the appended claims rather than by the description of the preferred embodiment.

I claim:

1. A seal assembly for use in a cable cylinder to form an effective seal about a generally cylindrical cable, said seal assembly comprising:

a first generally disc shaped seal retaining member having a center opening extending around said generally cylindrical cable;

a second generally disc shaped seal retaining member having a center opening extending around said generally cylindrical cable;

a gland having a generally cylindrical bore extending around said generally cylindrical cable, a shoulder portion extending radially inwardly from said cylindrical bore near one end thereof for engagement by said first generally disc shaped seal retaining member and an inner groove near the other end of said cylindrical bore for engagement by said second generally disc shaped retaining member, said gland including an inner retaining lip adjacent to said inner groove and on the opposite side of said inner groove as said cylindrical bore for retaining said second disc shaped seal retaining member within said groove and one of said gland and said second disc shaped seal retaining member including means enabling said second seal retaining member to be manually urged past said inner retaining lip for seating within said groove;

a seal member disposed within the cylindrical bore of said gland and between said first and second retaining members for forming an effective seal with the inner surface of said cylindical bore and the outer surface of said generally cylindrical cable.

2. The seal assembly of claim 1 wherein said seal member includes a pressure side and wherein said first retaining member is disposed opposite the pressure side of said seal member and said second retaining member is disposed adjacent to the pressure side of said seal member.

3. The seal assembly of claim 2 wherein each of said cylindrical bore, said inner groove and said inner retaining lip has an inner diametrical dimension and wherein the inner diameter of said cylindrical bore is less than the inner diameter of either of said inner groove and said inner retaining lip and the inner diameter of said inner retaining lip is less than the inner diameter of said inner groove.

4. The seal assembly of claim 3 wherein the outer diameter of said second generally disc shaped seal retaining member is greater than the inner diameter of said inner retaining lip but less than the inner diameter of said inner groove, thereby permitting said second retaining member to be retained within said inner groove by said inner retaining lip.

5. The seal assembly of claim 4 wherein one of said gland and said second seal retaining member is constructed of a flexible material to permit said second seal retaining member to be manually forced past said inner retaining lip for seating within said inner groove.

6. The seal assembly of claim 4 wherein said gland includes a plurality of slots extending longitudinally to the axis of said gland and extending from the pressure end of said gland to a point at least past said inner retaining lip to give a portion of said gland flexibility and to permit said second seal retaining member to be manually forced past said inner retaining lip for seating within said inner groove.

7. The seal assembly of claim 5 wherein said inner groove includes a generally cylindrical section.

8. The seal assembly of claim 7 wherein said inner retaining lip includes a generally conical surface on each side of the lip portion for facilitating easy insertion and removal of said second seal retaining member.

9. The seal assembly of claim 1 wherein said second seal retaining member is inserted into and removed from said inner groove by an appropriate manual force exerted thereon along its longitudinal axis.

10. A cable cylinder comprising:
a cylinder;
a piston disposed within said cylinder and defining at least one hydraulic chamber;
a generally cylindrical cable connected with said piston and extending through said hydraulic chamber; and
a seal assembly for forming an effective seal about said cylindrical cable comprising;
a first generally disc shaped seal retaining member having a center opening extending around said generally cylindrical cable;
a second generally disc shaped seal retaining member having a center opening extending around said generally cylindrical cable;
a gland having a generally cylindrical bore extending around said generally cylindrical cable, a shoulder portion extending radially inwardly from said cylindrical bore near one end thereof for engagement by said first generally disc shaped seal retaining member and an inner groove near the other end of said cylindrical bore for engagement by said second generally disc shaped retaining member, said gland including an inner retaining lip adjacent to said inner groove and on the opposite side of said inner groove as said cylindrical bore for retaining said second disc shaped seal retaining member within said groove and one of said gland and said second disc shaped seal retaining member including means enabling said second seal retaining member to be manually urged past said inner retaining lip for seating within said groove;
a seal member disposed within the cylindrical bore of said gland and between said first and second retaining members for forming an effective seal with the inner surface of said cylindrical bore and the outer surface of said generally cylindrical cable.

* * * * *